United States Patent
Stanek et al.

(10) Patent No.: US 9,555,704 B2
(45) Date of Patent: Jan. 31, 2017

(54) SYSTEM AND METHOD FOR INHIBITING ENGINE OPERATION DURING FUELING

(71) Applicant: FORD GLOBAL TECHNOLOGIES, LLC, Dearborn, MI (US)

(72) Inventors: Joseph F. Stanek, Northville, MI (US); Lisa Scott, Northville, MI (US); Jeffrey Alan Palic, Canton, MI (US); Mark Davison, Dearborn, MI (US); John A Lockwood, Canton, MI (US); Donald Charles Franks, Linden, MI (US)

(73) Assignee: FORD GLOBAL TECHNOLOGIES, LLC., Dearborn, MI (US)

(*) Notice: Subject to any disclaimer, the term of this patent is extended or adjusted under 35 U.S.C. 154(b) by 264 days.

(21) Appl. No.: 14/333,550

(22) Filed: Jul. 17, 2014

(65) Prior Publication Data
US 2016/0016468 A1    Jan. 21, 2016

(51) Int. Cl.
| | |
|---|---|
| F02D 35/00 | (2006.01) |
| B60K 28/10 | (2006.01) |
| B67D 7/32 | (2010.01) |
| F02N 11/08 | (2006.01) |

(52) U.S. Cl.
CPC .......... B60K 28/10 (2013.01); B67D 7/3245 (2013.01); F02D 35/00 (2013.01); F02N 11/0833 (2013.01); B60Y 2300/30 (2013.01); B60Y 2300/436 (2013.01); B60Y 2400/301 (2013.01); F02N 2200/08 (2013.01); F02N 2200/123 (2013.01); Y10S 903/902 (2013.01)

(58) Field of Classification Search
CPC .......... F02D 35/00; F02D 29/02; F02D 45/00; B60K 28/10; B67D 7/32; B67D 7/3245; B60Y 2300/30; B60Y 2300/436; B60Y 2400/301
See application file for complete search history.

(56) References Cited

U.S. PATENT DOCUMENTS

| | | | |
|---|---|---|---|
| 6,990,945 B1 | 1/2006 | Kropinski et al. | |
| 7,668,644 B2 * | 2/2010 | Tengler | G01C 21/36 340/450.2 |
| 7,806,456 B1 | 10/2010 | Zandparsa | |
| 2003/0150417 A1 | 8/2003 | Miwa | |
| 2010/0252352 A1 | 10/2010 | Zuck et al. | |
| 2014/0026992 A1 | 1/2014 | Pearce et al. | |

FOREIGN PATENT DOCUMENTS

| | | | |
|---|---|---|---|
| JP | H09254670 | 9/1997 | |
| JP | 2007127087 A * | 5/2007 | ............. F02D 29/02 |

OTHER PUBLICATIONS

"Straight Dope" comment, http://boards.straightdope.com/sdmb/archive/index.php/t-259221.html, dated Jun. 21, 2004.
"Prius Chat" comment, http://priuschat.com/threads/no-need-to-power-off-while-refueling.38456/page-3, dated Oct. 29, 2007.

* cited by examiner

*Primary Examiner* — Hieu T Vo
(74) *Attorney, Agent, or Firm* — Carlson, Gaskey & Olds, P.C.

(57) ABSTRACT

A method according to an exemplary aspect of the present disclosure includes, among other things, inhibiting operation of an internal combustion engine of a vehicle based on a proximity of the vehicle to a fueling location.

20 Claims, 2 Drawing Sheets

SYSTEM AND METHOD FOR INHIBITING ENGINE OPERATION DURING FUELING

BACKGROUND

It may be desirable to assist vehicle operators in turning off a vehicle's internal combustion engine while fueling. At a minimum, if the vehicle is not completely turned off, it may be beneficial to ensure the vehicle's internal combustion engine is off during fueling, in particular the internal combustion engine of a hybrid vehicle.

Hybrid vehicles can be selectively driven with an internal combustion engine. A hybrid vehicle can be turned on even when the internal combustion engine is off. Owners of hybrid vehicles may keep their vehicles turned on during fueling. A hybrid vehicle's internal combustion engine is typically not operating when fueling begins.

SUMMARY

A method according to an exemplary aspect of the present disclosure includes, among other things, inhibiting operation of an internal combustion engine of a vehicle based on a proximity of the vehicle to a fueling location.

In a further non-limiting embodiment of the foregoing method, the method includes detecting whether the vehicle is at a fueling location, and inhibiting operation of the internal combustion engine when the vehicle is at the fueling location.

In a further non-limiting embodiment of the foregoing method, the detecting is based on information from at least one of (1) a global positioning system (GPS), (2) a wireless communication system, or (3) a camera-based detection system.

In a further non-limiting embodiment of the foregoing method, the method includes detecting whether a fueling event is occurring, and inhibiting operation of the internal combustion engine when the fueling event is occurring.

In a further non-limiting embodiment of the foregoing method, detecting whether the fueling event is occurring further comprises at least one of (1) detecting a pressure within a fuel tank, (2) detecting whether a door to a fuel tank is open, or (3) detecting whether a fuel cap has been removed from the fuel tank.

In a further non-limiting embodiment of the foregoing method, the method includes detecting the power level of a battery of the vehicle during the fueling event, and turning off the vehicle if the power level falls below a lower threshold.

In a further non-limiting embodiment of the foregoing method, the method includes detecting the power level of a battery of the vehicle during the fueling event, and turning off an auxiliary component drawing power from the battery if the power level falls below a lower threshold.

In a further non-limiting embodiment of the foregoing method, the method includes detecting whether the vehicle is parked before the step of detecting whether a fueling event is occurring.

In a further non-limiting embodiment of the foregoing method, the method includes detecting whether the vehicle is on before the step of detecting whether a fueling event is occurring.

In a further non-limiting embodiment of the foregoing method, the method includes, after a fueling event is detected, monitoring whether fueling has completed, and allowing normal operation of the internal combustion engine when fueling has completed.

A system for a vehicle having an internal combustion engine according to an exemplary aspect of the present disclosure includes, among other things, a controller inhibiting operation of the internal combustion engine based on a proximity of the vehicle to a fueling location.

In a further non-limiting embodiment of the foregoing system, the system includes a location system detecting a location of the vehicle, the controller inhibiting operation of the internal combustion engine based on information from the location system.

In a further non-limiting embodiment of the foregoing system, the location system comprises at least one of (1) a global positioning system (GPS), (2) a wireless communication system, or (3) a camera-based detection system.

In a further non-limiting embodiment of the foregoing system, the controller inhibits operation of the internal combustion engine when a fueling event is detected.

In a further non-limiting embodiment of the foregoing system, the system includes a fuel tank fluidly connected to the internal combustion engine, and the controller detects a fueling event based on information relating to at least one of (1) a pressure within the fuel tank, (2) whether a door to a fuel tank is open, or (3) whether a fuel cap has been removed from the fuel tank.

In a further non-limiting embodiment of the foregoing system, the controller detects whether the vehicle is on before detecting the fueling event.

In a further non-limiting embodiment of the foregoing system, the controller detects whether the vehicle is parked before detecting the fueling event.

In a further non-limiting embodiment of the foregoing system, the controller allows normal operation of the internal combustion engine when fueling has completed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
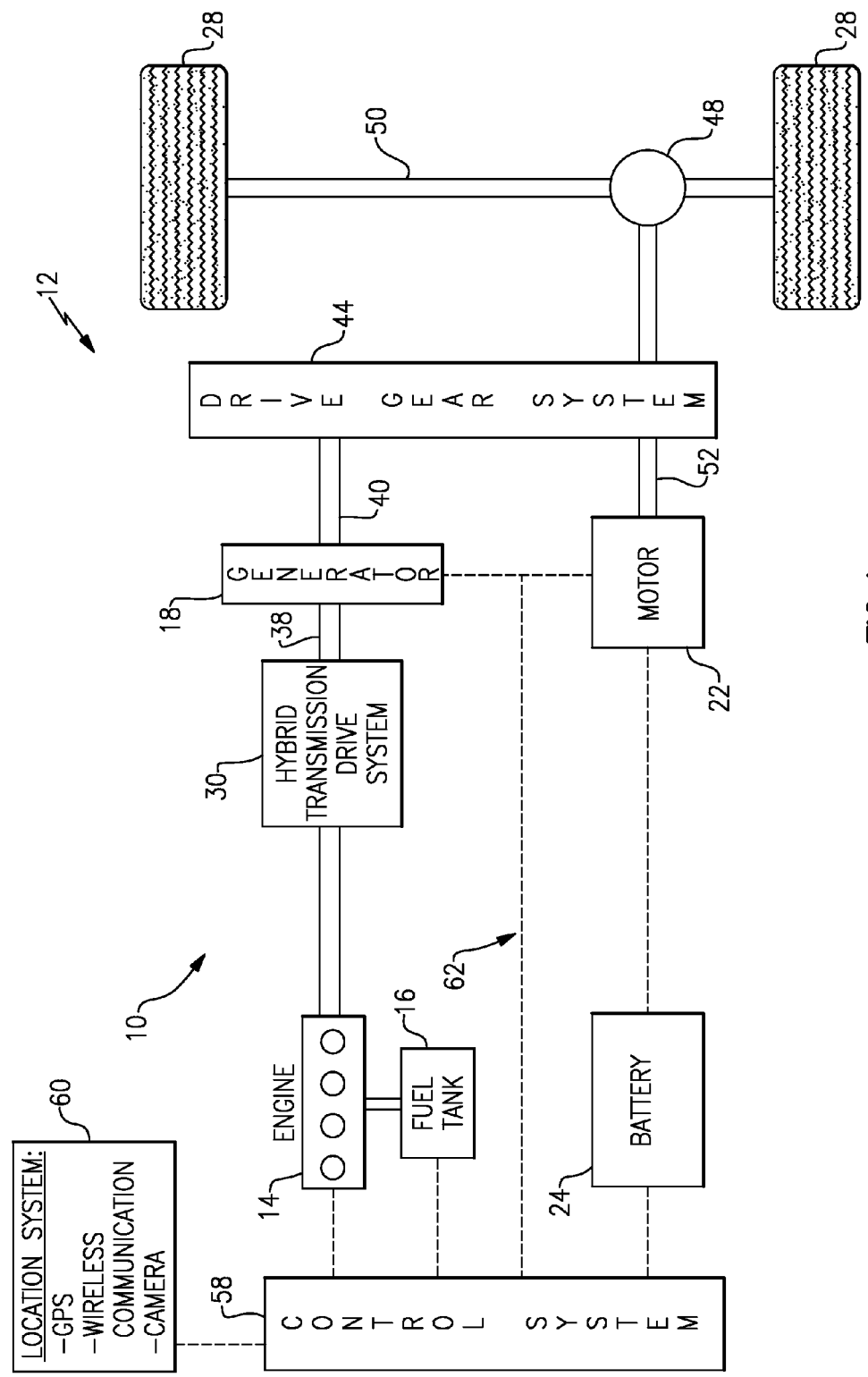
FIG. 1 schematically illustrates a powertrain of an electrified vehicle.

FIG. 1 schematically illustrates a powertrain 10 of an electrified vehicle 12 ("vehicle 12"). Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), and modular hybrid transmission vehicles. This disclosure also extends to stop-start vehicles, vehicles powered only by an internal combustion engine (ICE), hydrogen vehicles (including both internal combustion and fuel cell hydrogen vehicles), natural gas vehicles, and propane vehicles, among others.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this embodiment, the second drive system is considered an electric drive system of the powertrain 10. The first and second drive systems generate torque to drive one or more sets of vehicle drive wheels 28 of the vehicle 12.

The engine 14, which is an internal combustion engine (ICE) in this embodiment, receives fuel, such as gasoline, from a fuel tank 16. Depending on the type of vehicle, fuels other than gasoline may be used. The engine 14 and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. Other types of energy storage devices and/or output devices can also be used to supply power within the vehicle 12.

The powertrain 10 may additionally include a control system 58 for monitoring and/or controlling various aspects of the vehicle 12. For example, the control system 58 may communicate with the electric drive system, the power transfer units 30, 44, or other components to monitor the vehicle 12, control the vehicle 12, or both. In this example, the control system 58 is in communication with the fuel tank 16, and a location system 60.

With respect to the fuel tank 16, the control system 58 may communicate with one or more sensors, such as pressure sensors, configured to determine that a level of fuel within the fuel tank 16 is changing. The control system 58 may further be in communication with a fuel door, or fuel cap (if present) to determine whether an operator is attempting to gain access to the fuel tank.

The location system 60 may be a global positioning system (GPS), a wireless communication system (such as a radio-frequency identification system), or a camera-based, shape detection system.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices.

A controller area network (CAN) 62 allows the control system 58 to communicate with the various component of the vehicle 12. Among other things, the control system 58 may receive signals from the location system 60 indicating a location of the vehicle 12, for example. The control system 58 may also communicate with sensors associated with the fuel tank 16 indicating a level of fuel within the fuel tank 16.

Figure 2:
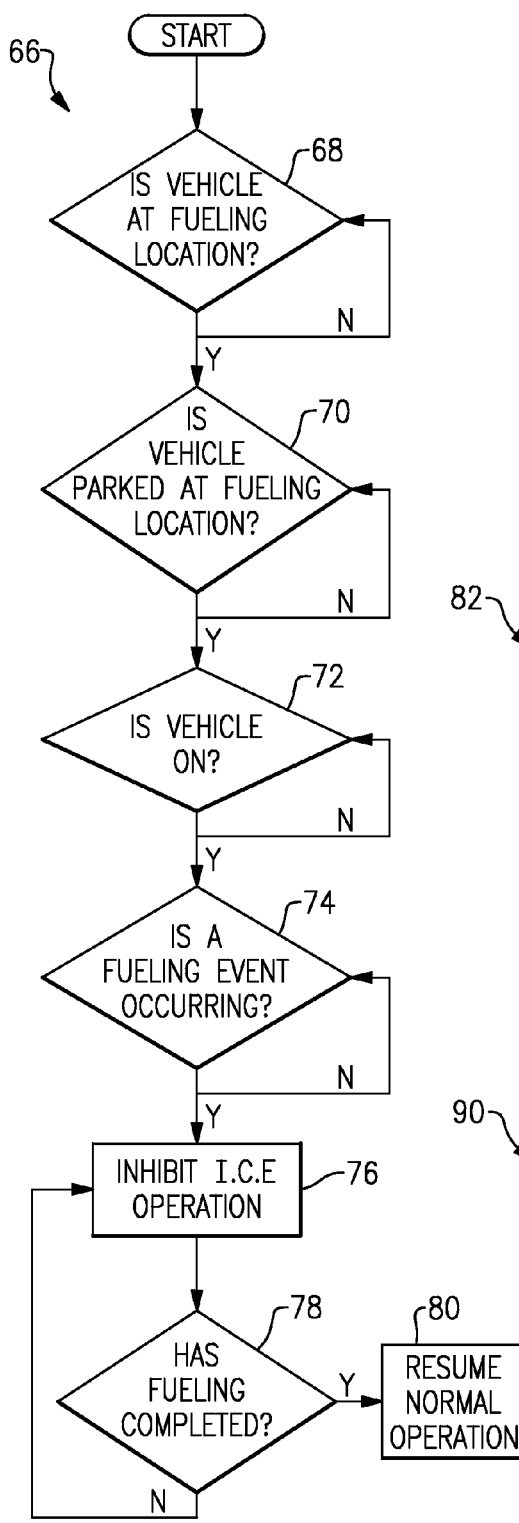
FIG. 2 is a flowchart illustrating a first example method related to hybrid electric vehicles.

Referring to FIG. 2, and with continued reference to FIG. 1, in a first example method 66 according to this disclosure, the control system 58 detects the proximity of the vehicle 12 to a fueling location, at 68, using the location system 60. As used herein, the term "fueling location" refers locations where vehicles can be fueled, such as gas stations. Further, as used herein, the term "fueling" means to supply or add fuel, such as by supplying fuel into the fuel tank 16 of the vehicle 12. "Fueling" includes "refueling."

Figure 3:
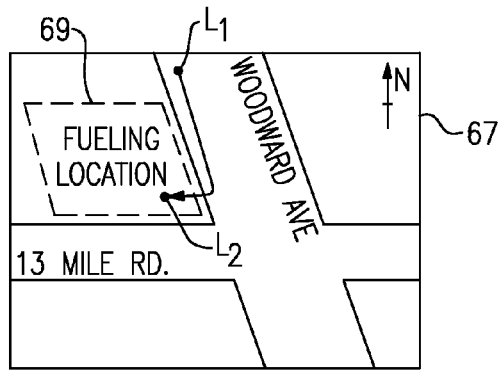
FIG. 3 illustrates an example map used for detecting whether a vehicle is at a fueling location.

In one example, at 68, the control system 58 detects whether the vehicle 12 is at a fueling location using GPS. FIG. 3 illustrates an example map 67. Within the map 67, a fueling location 69 is identifiable. The control system 58 may have the map 67 stored in its memory, for example, and the map 67 may include known fueling locations, such as the fueling location 69. In FIG. 3, a vehicle travels from a first location $L_1$ outside the fueling location 69, and stops at a second location $L_2$ within the fueling location 69. Once the vehicle breaches the perimeter of the fueling location 69, the control system 58 detects that the vehicle is at a fueling location. Again, while GPS is specifically discussed above, the location system 60 may alternatively, or additionally, include other location detection devices.

After establishing that the vehicle is at a fueling location in step 68, the control system 58 detects whether the vehicle 12 is parked, at 70. If so, at 72, the control system 58 then detects whether the vehicle 12 is on. That is, the control system 58 detects whether it is possible for the engine 14 to be activated during a fueling event. Steps 70 and 72 are not required in all examples. Further, when steps 70 and 72 are included, the order can be varied. That is, step 72 may be performed before step 70.

At 74, the control system 58 detects whether a fueling event is occurring. As used herein, the term "fueling event" refers to an event indicating that fuel is about to be added into the fuel tank 16, or that fuel is actually being added into the fuel tank 16. In one example, a fueling event includes detecting whether the door to the fuel tank is open. In another example, the control system 58 detects whether the fuel tank 16 is depressurized (as caused by removing a fuel cap, for example). Alternatively, or in addition, a fueling event is detected when a level of fuel increases within the fuel tank 16. In that case, as the fuel level rises, pressure within the fuel tank 16 increases. This increase in pressure is detected by sensors associated with the fuel tank 16, and the control system 58 detects a fueling event. It should be understood that the control system 58 can detect a fueling event 74 based on a single factor, or a combination of factors.

If a fueling event is detected at 74, then operation of the engine 14 is inhibited, or prevented, at 76. In some prior hybrid vehicles, the vehicle may be on during fueling, although the internal combustion engine of the vehicle is off when fueling begins. In such examples, the internal combustion engine could undesirably turn on during a fueling event. The internal combustion engine in the prior art may turn on if the power level of the vehicle's battery falls below a lower threshold, for example. The battery may fall below the threshold if, for example, the power level of the battery is relatively low when fueling begins, or if auxiliary components (e.g., heating/cooling systems) are drawing a relatively high level of power during fueling.

In the present method 66, if the power level of the battery 24 falls below a lower threshold during fueling, the control system 58 would not turn on the engine 14. Instead, the control system 58 would either shut down the auxiliary components (e.g., those that are draining the battery 24) or would turn the vehicle 12 off entirely. Thus, operation of the internal combustion engine during fueling is avoided.

The control system 58 continually monitors, at 78, whether fueling has completed. In one example, at 78, the completion of fueling is indicated by one or more of (1) reopening of the driver's side door (indicating the vehicle operator has reentered the vehicle), (2) application of the brake and shifting the vehicle 12 into gear, and (3) a stall, or timeout, in fueling (indicated, in one example, by the pressure within the fuel tank 16 remaining constant). Another example factor includes detecting whether the fuel nozzle has been removed from the vehicle's fuel fill pipe. It should be understood that the control system 58 can detect whether fueling has completed based on one or more factors.

When fueling completes, normal engine operation is resumed, at 80, and the engine 14 is allowed to operate in the normal manner. That is, operation of the engine 14 is no longer inhibited. Accordingly, this disclosure increases safety during fueling.

Figure 4:
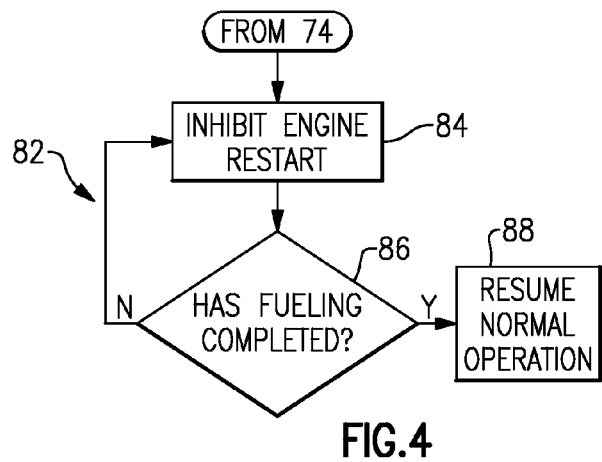
FIG. 4 is a partial flowchart illustrating a second example method related to stop-start vehicles.

While an HEV is specifically described above, this disclosure extends to other types of vehicles. For instance, FIG. 4 illustrates a method 82 relating to stop-start vehicles. As is known, stop-start vehicles include an internal combustion engine (ICE) that is turned on and off during operation to maximize fuel economy. The method 82 of FIG. 4 is substantially similar to the method 66 of FIG. 2 through step 74. In the method 82, if a stop-start vehicle is at a fueling location, parked, on, and a fueling event is occurring (e.g., there was a "yes" at each of steps 68, 70, 72, and 74), the stop-start engine is prevented from restarting, at 84. Similar to step 76 in FIG. 2, instead of turning on the engine of the stop-start vehicle, the auxiliary components drawing power from the stop-start battery would be shut down, or, alternatively, the stop-start vehicle would be turned off entirely. When fueling has completed, at 86, normal operation of the stop-start engine is allowed to resume, at 88.

Figure 5:
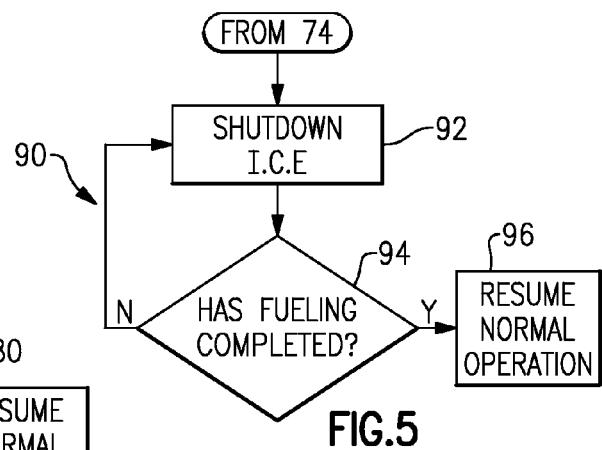
FIG. 5 is a partial flowchart illustrating a third example method related to vehicles having only an internal combustion engine.

FIG. 5 illustrates another method 90 relating to vehicles that are driven only by an internal combustion engine (i.e., vehicles including internal combustion engines that are not also hybrid vehicles). The method 90 is similar to the method 66 through step 74. In the method 90, if a fueling event is occurring (e.g., there was a "yes" at step 74), then the internal combustion engine is turned off, at 92. Alternatively, the vehicle may be turned off entirely. Once fueling has completed, at 94, normal operation is resumed, at 96. In this instance, resuming normal operation may include allowing a user to turn the vehicle back on, or the vehicle may automatically be turned on.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. In particular, while not specifically mentioned above, it should be understood that this disclosure extends to autonomous vehicles (e.g., vehicles capable of driving themselves). Accordingly, the following claims should be studied to determine their true scope and content.

We claim:

1. A method, comprising:
    inhibiting operation of an internal combustion engine of a vehicle based on a proximity of the vehicle to a fueling location.

2. The method as recited in claim 1, further comprising:
    detecting whether the vehicle is at a fueling location, and inhibiting operation of the internal combustion engine when the vehicle is at the fueling location.

3. The method as recited in claim 2, wherein the detecting is based on information from at least one of (1) a global positioning system (GPS), (2) a wireless communication system, or (3) a camera-based detection system.

4. The method as recited in claim 1, further comprising:
    detecting whether a fueling event is occurring, and inhibiting operation of the internal combustion engine when the fueling event is occurring.

5. The method as recited in claim 4, wherein detecting whether the fueling event is occurring further comprises at least one of (1) detecting a pressure within a fuel tank, (2) detecting whether a door to a fuel tank is open, or (3) detecting whether a fuel cap has been removed from the fuel tank.

6. The method as recited in claim 4, further comprising:
    detecting the power level of a battery of the vehicle during the fueling event; and
    turning off the vehicle if the power level falls below a lower threshold.

7. The method as recited in claim 4, further comprising:
    detecting the power level of a battery of the vehicle during the fueling event; and
    turning off an auxiliary component drawing power from the battery if the power level falls below a lower threshold.

8. The method as recited in claim 4, further comprising:
    detecting whether the vehicle is parked before the step of detecting whether a fueling event is occurring.

9. The method as recited in claim 4, further comprising:
    detecting whether the vehicle is on before the step of detecting whether a fueling event is occurring.

10. The method as recited in claim 4, further comprising:
after a fueling event is detected, monitoring whether fueling has completed; and
allowing normal operation of the internal combustion engine when fueling has completed.

11. A system for a vehicle having an internal combustion engine, comprising:
a controller inhibiting operation of the internal combustion engine based on a proximity of the vehicle to a fueling location.

12. The system as recited in claim 11, further comprising:
a location system detecting a location of the vehicle, the controller inhibiting operation of the internal combustion engine based on information from the location system.

13. The system as recited in claim 12, wherein the location system comprises at least one of (1) a global positioning system (GPS), (2) a wireless communication system, or (3) a camera-based detection system.

14. The system as recited in claim 11, wherein the controller inhibits operation of the internal combustion engine when a fueling event is detected.

15. The system as recited in claim 14, further comprising:
a fuel tank fluidly connected to the internal combustion engine, the controller detecting a fueling event based on information relating to at least one of (1) a pressure within the fuel tank, (2) whether a door to a fuel tank is open, or (3) whether a fuel cap has been removed from the fuel tank.

16. The system as recited in claim 14, wherein the controller detects whether the vehicle is on before detecting the fueling event.

17. The system as recited in claim 14, wherein the controller detects whether the vehicle is parked before detecting the fueling event.

18. The system as recited in claim 14, wherein the controller allows normal operation of the internal combustion engine when fueling has completed.

19. The method as recited in claim 1, wherein:
the vehicle is a hybrid electric vehicle selectively powered by one of a battery and the internal combustion engine, and
when the hybrid electric vehicle is powered by the battery as a fueling event begins, operation of the internal combustion engine is inhibited during the fueling event.

20. The system as recited in claim 11, wherein:
the vehicle is a hybrid electric vehicle selectively powered by one of a battery and the internal combustion engine, and
when the hybrid electric vehicle is powered by the battery as a fueling event begins, operation of the internal combustion engine is inhibited during the fueling event.

* * * * *